June 4, 1968 P. R. EVERHARD 3,386,554

SHIFT-PRINT INTERLOCK

Filed Feb. 27, 1967 2 Sheets-Sheet 1

INVENTOR.
PAUL R. EVERHARD
BY John A. Brady
ATTORNEY.

3,386,554
SHIFT-PRINT INTERLOCK
Paul R. Everhard, Lexington, Ky., assignor to International Business Machines Corporation, Armonk, N.Y., a corporation of New York
Filed Feb. 27, 1967, Ser. No. 618,691
14 Claims. (Cl. 197—71)

ABSTRACT OF THE DISCLOSURE

In the preferred embodiment shown structures are illustrated to prevent a printing function from being initiated once a case shift function is begun and vice-versa. A shift interposer is latched forward until it is freed by operation of a shift key. Depression of a shift key frees the shift interposer to move backward under the influence of a spring. Movement of the shift interposer causes it to enter a ballsometer interlock and to rotate a linkage which frees a cycle clutch to thereby initiate a shift operation. The cycling shift mechanisms carry two cams. The upper case cam is conformed to push the shift interposer out of the interlock and into a temporarily latched position which holds while the shaft key is down, but not into a fully latched position. The lower case cam is conformed to push the shift interposer both out of the interlock and into the fully latched position. Both cams push the linkage so that the linkage disengages the shift clutch after one shift cycle. When printing occurs before a shift operation, the ballsometer intrlock is initially effective and a cam on the pint shaft prevents movement of the shift interposer at a time well into the print cycle.

BACKGROUND

There is described in U.S. Patent 2,919,002, issued Dec. 29, 1959, to L. E. Palmer, a typewriter having a single element print head with characters formed on its surface. The sector of the surface laying on one side of a vertical bisecting plane carries lower case characters while the sector on the opposite side carries upper case characters. The head is rotated, on actuation of a type key, from a home position in either the lower case sector or the upper case sector to select a character for printing. Another key actuated mechanism is operable for rotating the head to effect a case shift by presenting either the lower case sector or the upper case sector for the selection of characters. The rotating means includes a single tape to cause rotation which is common to both the character selection mechanism and the case shift mechanism. If a printing operation and a case shift operation took place at the same time, the tape may or may not be broken and, in either case, the character typed and related functions would be incorrect.

In U.S. Patent 3,077,971, issued Feb. 19, 1963, to L. E. Palmer, an interlock is described to prevent most incorrect character selections in a typewriter of the kind under consideration and to normally always protect the tape and related mechanisms from being disabled. In accordance with the system shown in U.S. Patent 3,077,971, operation of the case shift mechanism moves a bar which positions mechanisms so that the print cycle clutch cannot be activated, while operation of the print cycle mechanism moves a pawl into a holding arrangement to positively disable the case shift mechanisms. As mentioned in U.S. Patent 3,077,971, it is possible that both the case shift mechanism and the print cycle mechanism may begin to move at the same time. In this event, the structures shown in U.S. 3,077,971 cause the case shift mechanism to be disabled shortly after the simultaneous movement is begun. The character printed may be incorrect, but the mechanisms of the typewriter are not damaged.

It is desirable in many applications to provide an interlock between the printing functions and the shifting functions which will not permit any overlap of the movement of those functions. Such an interlock would be particularly important when the mechanisms to rotate the print head might be put out of adjustment or damaged by movements resulting from even a slight overlap of the two functions. It is a primary object of this invention to provide such an interlock.

It is a more specific object of this invention to provide an interlock which positively prevents any concurrence of the printing functions and the shifting functions of a typewrier of the general type shown in U.S. 2,919,002.

It is another, more specific object of this invention to provide an interlock permitting economic and efficient implementation to achieve more complete interlocking.

In accordance with this invention, interlock against printing or other function after the initiation of a shift function is achieved by a linkage to the structures which move during a shift operation. A shift interposer is provided which is moved in response to depression of a shift key. As is usual, it is desired that depression of the shift key will initiate one shift operation and that release or return of the shift key at any subsequent time will cause another shift operation at that time. To implement this, cam surfaces are provided on the structures which move during a shift operation. The cam surface operative near the termination of that shift function which is initiated by a shift key operation to cause shift to upper case, is conformed to push the linkage enough to remove the interlocking and to bring the shift interposer into a temporarily latched position, but not enough to bring the shift interposer into a normally fully latched position. The cam surface operative near the termination of a shift function initiated by release of a shift key from the upper case position, is conformed to push the linkage enough to remove the intrlock and to bring the shift interposer to the fully latched position. Release of the shift key from the upper case position is automatically effective to free the shift interposer from the temporarily latched position and to thereby cause a down shift operation. A particular feature of the preferred embodiment is that the shift interposer carries a section which enters the type of interlock which responds to the occupation of space by one interposer to stop effective movement of any other interposer. In addition to the general interlocking thereby provided, this also provides a positive interlock during the initial time of a print cycle in which a print interposer is positioned in the interlock. Interlocks of the type used, in particular of the kind in which a number of balls are situated with a pre-established slack spacing side by side in a race, are already found in typewriters of the kind shown in the preferred embodiment here. Also, in the more specific aspects described, the linkage from the shift interposer is also operative to start and stop the clutch mechanisms which cause the shift movement.

The foregoing and other objects, features and advantages of the invention will be apparent from the following more particular description of a preferred embodiment of the invention, as illustrated in the accompanying drawings.

BASIC SYSTEM

Figure 1:
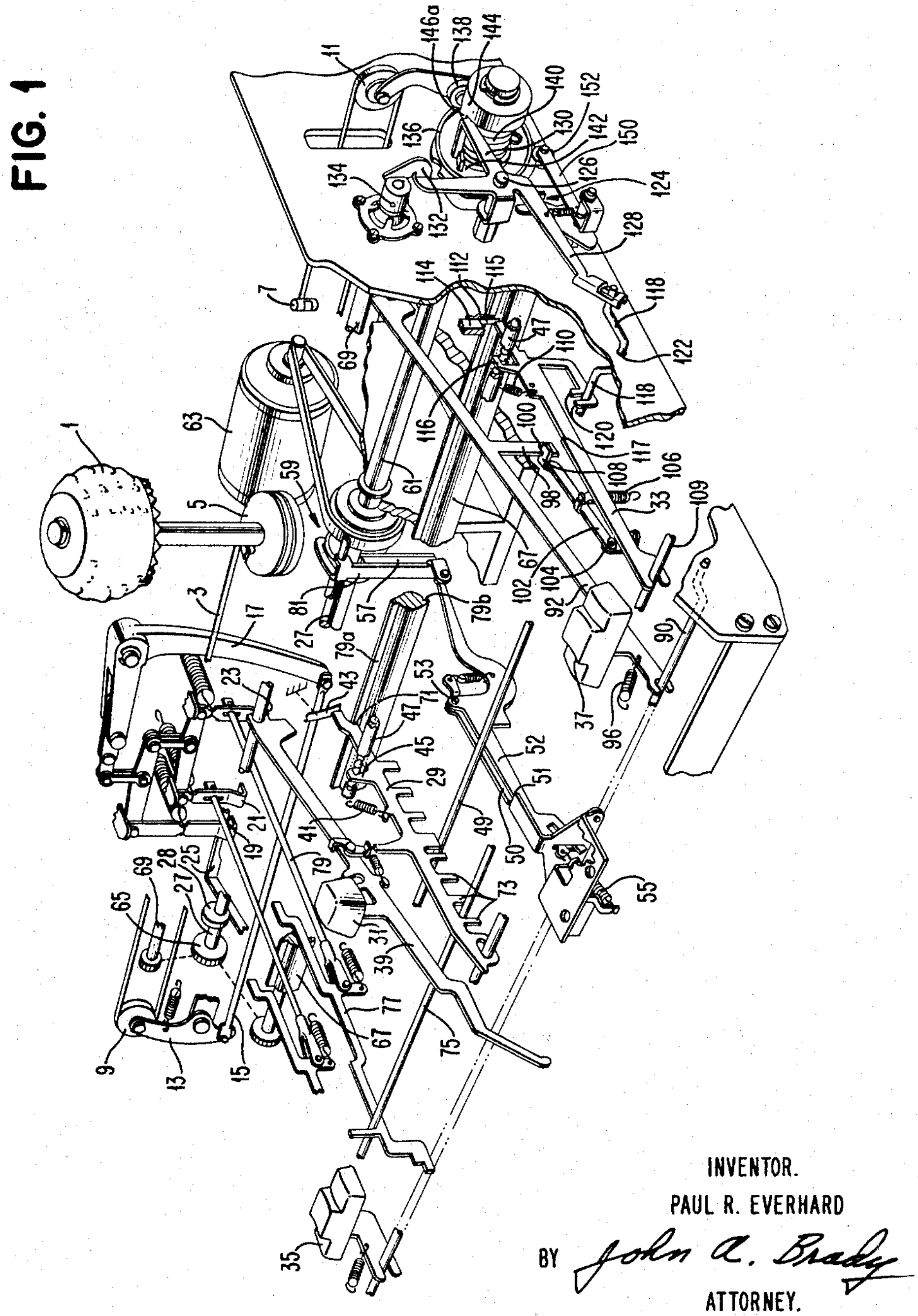
FIGURE 1 is a view from an angle (with covers and some parts not shown) illustrating the invention and structures particularly pertinent to the preferred environment of the invention.

Reference is made to FIG. 1 where is shown the mechanism of the preferred form of this invention and the silent features of the other typewriter mechanisms which are the preferred environment of this invention. The typewriter has a spherical, single element print head 1 which is rotated, tilted and impacted on a platen (not shown) to effect printing of a selected character formed on print head 1.

Print head 1 is rotated through the agency of a flexible tape 3 which is wound around spindle 5 on which print head 1 is mounted. A spring (not shown) internal to spindle 5 acts in a direction and with a force to keep tape 3 taut. Tape 3 is held stationary at anchor 7.

The tape 3 extends over pulley 9 on the left side of the typewrier and pulley 11 on the right side of the typewriter. Pulley 9 is moved leftwardly to control the normal rotation selection of head 1 for characters during printing. Pulley 11 is moved in one direction to effect movement of print head 1 from its initial position to a position at which characters associated with one shift position, which are formed on one half of print head 1, will be selected and printed; and pulley 11 is moved in the opposite direction to effect reverse turning of print head 1 one-half revolution back to its initial position so that characters associated with the other shift position will be selected and printed.

Pulley 9 is moved by arm 13, through link 15 from bellcrank 17. Selecting latches 19, 21, and 23 are operatively connected with bellcrank 17. During a printing operation, as distinguished from a case shift operation, selected one of the latches 19, 21, and 23 are pulled from under bail 25. In this manner a cycle shaft 27, operating on bail 25 through cam 28 is effective to cause different amounts of rotation of print head 1 dependent upon which of the latches 19, 21, and 23 have been pulled away from bail 25.

Basic to the operation of the keyboard involved are the interposers. Shown in FIG. 1 is one print function interposer, 29, illustrative of the several interposers actually in the typewriter, one associated with each print function keyboard key, such as key 31. One print function interposer is selected by a key operation and it is then operative during one print operation. Print function interposers, such as interposer 29, each associated with a keyboard key are found in previous typewriters of this kind. In accordance with this invention, however, a shift function interposer also is used in the structures. This is shift interposer 33, which is associated with the two shift keys 35 and 37. This one interposer and the associated parts will be described in detail below.

A print function operation occurs when a print keyboard key, such as key 31, is depressed thereby depressing a keylever, such as keylever 39, directly associated with it. This depresses the interposer 29 which is under keylever 39, which is normally held up by spring 41. When a print interposer, such as interposer 29, is moved, leaf spring 43 immediately moves over the top of the interposer 29 to thereby latch the interposer 29 down.

Of particular importance to the instant invention is that the downward movement of print interposer 29 brings upwardly hooked portion 45 of interposer 29 into ball interlock 47. The ball interlock, the latching down of print interposers by springs, and associated structures are generally known as illustrated, for example, by U.S. Patent 3,086,635, issued Apr. 23, 1963, to L. E. Palmer. The ball interlock is comprised of a number of balls fitted side by side for easy lateral movement in a race. Enough room is left between all of the balls so that the balls may move laterally to accept the entry of one interposer, but not of more than one interposer. When one interposer has entered the ball interlock, the balls are then relatively tightly held together and prevent by their presence the entry of any substantial portion of a second interposer.

Depression of a print function interposer 29 also causes the initiation of one cycle of printing operation. This is through the agency of bail 49, which is depressed by a depending part of each print function interposer, such as interposer 29. Depression of bail 49 is immediately operative on arm 50 to free arm 50 from engagement with a stationary ledge 51 near the front of the typewriter. Arm 50 is pivoted to arm 52 at point 53.

Spring 55 biases arm 52 generally forwardly at the front of the typewriter. Therefore, when arm 50 is freed from ledge 51, spring 55 causes movement of arms 50 and 52 forward, which is translated to latch lever 57. Movement of latch lever 57 releases the spring in a one-half revolution, spring clutch 59, to thereby cause a printing cycle. In this manner motion by constantly rotating shaft 61, which is driven by motor 63, is coupled to cycle shaft 27 so as to initiate a cycle of operation.

During a single cycle under the control of clutch 59 motion for rotating print head 1 is transferred from cycle shaft 27 through cams such as cam 28. Simultaneously, by gears linked to gear 65, filter shaft 67 is turned one-half revolution and print shaft 69, which passes through the carrier which holds print head 1, is driven through gears which increase the one-half revolution of shaft 27 to one full revolution.

Filter shaft 67 has two identical ledges 79*a* and 79*b*, one of which is initially situated against ledge 71 of each print function interposer, such as interposer 29, when that interposer is moved down in a print operation. Thus, during a print cycle filter shaft 67 through one of the ledges 79*a* or 79*b* pushes the selected interposer toward the front of the typewriter. At about 50 degrees of the print cycle (a full print cycle being sidered 360 degrees) portion 45 of the print interposer is forced out of the ball interlock 47. Further forward movement of the selected interposer, such as interposer 29, continues. Depending portions 73 of the interposer intersect bails, such as bail 75 (only one shown) situated transversly to the front of the typewriter. The depending portions 73 are in different permutations on each print function interposer so therefore different bails such as bail 75 are moved while others are not moved. The bails control the rotate tilt selection of the typehead 1. For example, bail 75 operates on selection latch 23 through the connection of links 77 and 79. Subsequently, cam 28 drives bail 25 to thereby effect the rotate operation. A rider 81 is controlled by a camming projection on clutch 59 to restore latch lever 57 and thereby terminate the action of clutch 59 after one-half revolution.

In general, the above printing device, with the exception of the shift interposer 33 and some associated structures, is the same as known machines of the general type disclosed in U.S. 3,077,971 and on sale for general use. Further detail of the preferred environment of this invention therefore will not be given here.

NEW STRUCTURES

Reference is made once again to FIG. 1 where the new structures in accordance with this invention will be discussed in some detail.

The shift operation is under the control of the typist by use of either of two shift keys 35 and 37, both of which pivot to the frame of the typewriter and move in unison because of the influence of rod 90 which extends between the two keys 35 and 37. The bend in rod 90 allows significant rotation.

Figure 2:
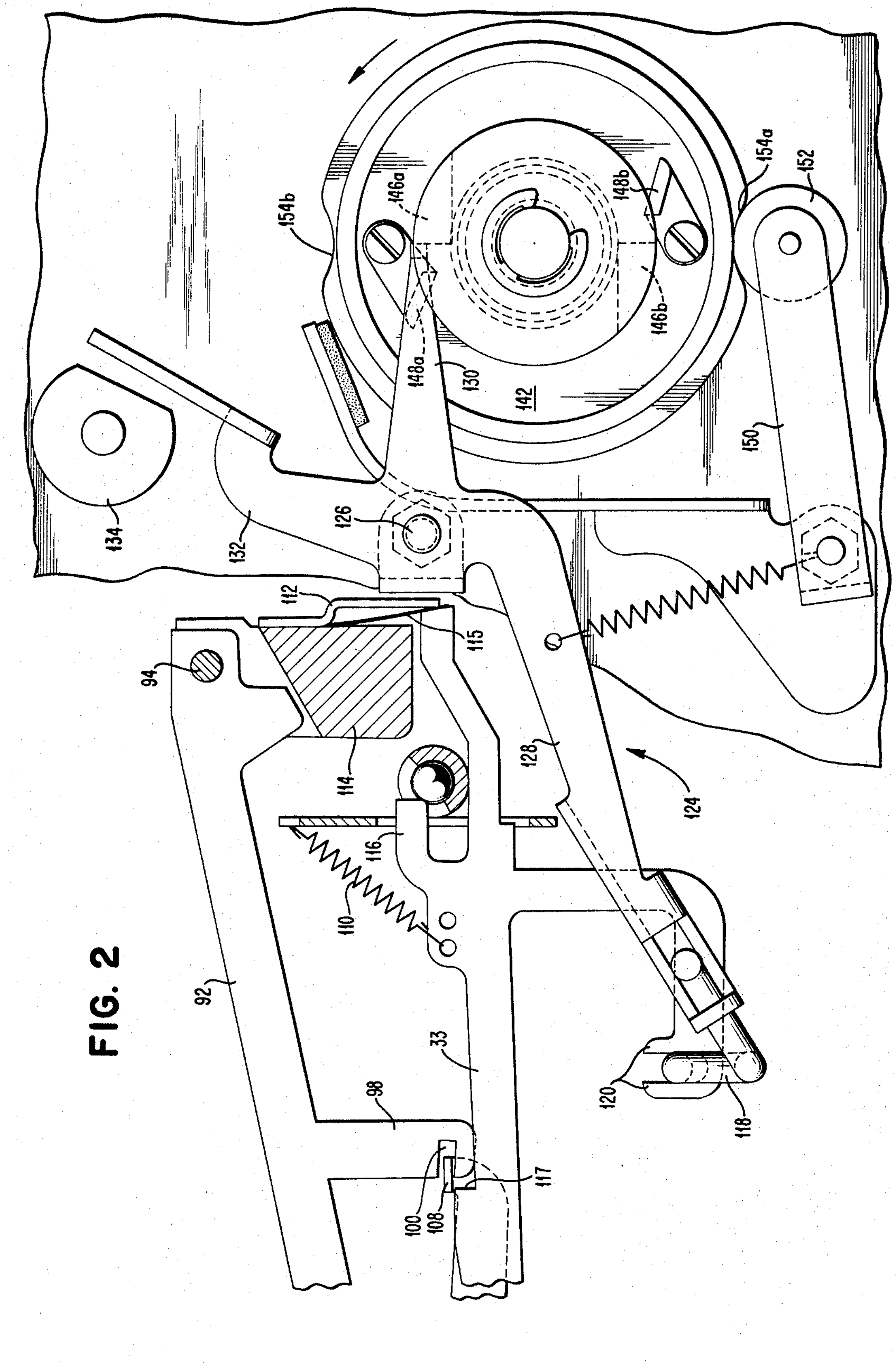
FIGURE 2 is a side view (with some environmental structures not shown) illustrating the invention.

One key, key 37, is directly connected to a shift keylever 92. Shift keylever 92 is pivoted to the frame at 94 (FIG. 2) at the rear part of the typewriter and is slidably connected to rod 90. Keylever 92 is biased greatly upward by spring 96. Shift keylever 92 carries a depending arm 98, having a slot 100. Arm 102 is freely pivoted to the typewriter at 104 and is biased lightly downwardly by spring 106. Arm 102 carries a laterally extending ledge 108 which fits into the slot 100. As will be discussed also below, ledge 108 is somewhat thinner than the height of slot 100 and therefore has some vertical slack in slot 100.

The outer part of ledge 108 intersects shift interposer 33, while depending arm 98 is situated to the side of interposer 33. Interposer 33 is formed around rod 109 so that it is pivoted to the frame, but free for lateral movement. Spring 110 connects between the shift interposer 33 and the frame of the typewriter. Spring 110 biases interposer 33 both upwardly and rearwardly in the typewriter. Interposer 33 is normally prevented from moving rearwardly by permanent stop 112 while interposer 33 is held against stop 112. When interposer 33 is pushed down, leaf spring 115 holds interposer 33 down until interposer 33 is moved forwardly in the typewriter past the location of spring 115. Interposer 33 carries an interlock operating portion 116, situated so as to enter the ball interlock 47 when interposer 33 moves forward past stop 112. Ball interlock 47 is operative to permit entry of only one at a time of all of the interposers, including all of the print function interposers and the shift interposer 33. The top of shift interposer 33 is formed into a notch 117, situated slightly rearward of where ledge 108 initially intersects interposer 33.

Connection to the shift mechanisms is by rod 118. Rod 118 is connected to interposer 33 by being fitted loosely in fork 120. Rod 118 is formed into a crank by its bent configuration through which it is connected to interposer 33 on one plane while being journaled to the frame at 122, which is on a different plane. Rod 118 extends out to loosely connect as a crank to spider 124.

Spider 124 is pivoted to the typewriter frame and spaced rightwardly from the frame by shaft 126. Spider 124 has three arms; rod engaging arm 128, shift movement arm 130, and print movement arm 132. Print cycle cam 134 is situated contiguous to the flat end of arm 132 and is driven directly by print shaft 69. Arm 130 acts as part of the shift cycle mechanisms.

As in the machine described in the above referenced U.S. 3,077,971, the shift cycle mechanisms comprise a cam 136, and roller 138 which follows the cam 136 to thereby move shift pulley 11 left or right, depending upon which shift position is selected. The shift mechanisms comprise a helical spring 140 partially overlapping a shaft portion normally continuously rotated by shaft 61 and partially overalapping a portion integral with the rotatable member 142 which carries cam 136. A spring holding member 144 holds one end of helical spring 140. Thus, as illustrated in more detail in the above referenced Patent 3,077,971, the assembly makes up a spring clutch in which torque from motor 63 is selectively transferred to pulley 11 to thereby achieve a shift operation of typehead 1.

Spring holding member 144 carries two lugs **146*a* and 146*b* (best seen in FIG. 2), each lug 146*a* and 146*b* being used after shift to a different one of the two shift positions. Rotatable member 142 carries lower case camming surface 148*a* and upper case camming surface 148*b*** (both seen in FIG. 2).

As in prior typewriters, each shift operation is detented in position after a 180° of rotation of member 142 by an upwardly biased arm 150 carrying a roller 152 positioned to sit in depressions **154*a* and 154*b* on opposite sides of rotatable member 142**.

OPERATION

A shift operation is initiated by depression of one of the shift keys 35 and 37. This results either directly or through the agency of rod 90, in shift key lever 92 being moved downwardly. After ledge 108 is contacted by the top of slot 100, ledge 108 forces shift interposer 33 to pivot downward around rod 109.

When the end of shift interposer 33 moves under stop 112, shift interposer 33 is then generally free to move rearwardly under the bias of spring 110. Interposer 33 is held down by spring 115. Should a print operation be in progress, however, two different interlocking operations occur to completely achieve full interlock, one interlock first occurs well into the print cycle by the action of print cycle cam 134. Cam 134 serves to interlock against shift operation by holding arm 132 of spider 124 against motion. This is true because print cycle cam 134 has a high dwell over its entire surface, except a one flat side which is presented to arm 132 when the cam 134 is not substantially into a print cycle. Should a shift key be depressed during a print cycle, spring 115 would hold shift interposer 33 down. Therefore, spring 110 will be effective and a shift operation will start as soon as the position of cam 134 permits substantial counterclockwise movement of spider 124. Interlock by cam 134 is effective only after somewhat less than 20 degrees into a 360 degree print cycle. Up to at least a point at which interlock by cam 134 becomes effective, however, the print interposer, such as interposer 29, for the print operation in progress is in ball interlock 47. Presence of a print interposer in interlock 47 prevents effective movement of shift interposer 33 and thus continuous interlocking between print and shift is achieved throughout a full print operation.

Assuming that print cycle cam 134 is in the position with the flat of cam 134 facing arm 132, which position occurs when no print cycle is well into movement, and assuming that no print interposer is in interlock 47, then, when key operation pushes interposer 33 under stop 112 and spring 115, interposer 33 moves rearward under the influence of spring 110. This cranks rod 118, which in turn cranks spider 124.

The events which occur are as follows:

Member 116 on interposer 33 enters ballsometer interlock 47. The presence of this one member fills the space in the interlock 47. No print interposer such as interposer 29, can move downward since its extending member cannot enter the interlock 47. Thus, positive interlocking against printing is assured.

Arm 128 is moved counterclockwise by the cranking action of rod 118. This moves arm 130 upwardly off of lugs **146*a* in spring holding member 144**.

Removal of arm 130 from lug **146*a* permits spring 140 to tighten. Thus, the shaft 61 is clutched to rotatable member 142. Member 142 begins rotating, carrying cam 136 across roller 138 to thereby move pulley 11 which thereby causes a shifting of head 1**.

Toward the end of 180 degrees of rotation of member 142 camming surface **148*b* comes into contact with the top end of arm 130, and arm 130 is cammed clockwise by camming surface 148*b*. This, of course, brings arm 128 upward, to thereby crank rod 118** counterclockwise as viewed in FIG. 1.

The configuration of camming surface **148*b* is not so great as to return the end of interposer 33 forward past spring 115. Surface 148*b* terminates the interlock against a printing function by forcing member 116 out of ball interlock 47 while interposer 33 is brought forward past stop 112. Spring 115 is effective to hold interposer 33 down under the stop 112. Arm 130 is pushed into lug 146*b* to thereby decouple the spring 140 of the clutch and thus terminate the movement of cam 136 relative to roller 138. Detent wheel 152 enters notch 154*b* to hold the assembly in place. Also, surface 148*b* is conformed to force interposer 33, through rod 118, back far enough so that notch 117 goes forward of ledge 108. Arm 130 leaves camming surface 148*b* somewhat before it intersects lug 146*b*. Then spring 110 is operative to move shift interposer 33 rearward, but ledge 108 is pulled by spring 106 behind notch 117. Interposer 33 is then latched forward by ledge 108 until the keys 35 and 37 are released, at which time spring 96 is strong enough to pull away ledge 108, which is moved by the edge of slot 100. (The slack betwen ledge 108 and slot 100 provides valuable functioning in that a more positive operation is assured. Interposer 33 is not operated until the slack is taken up. Then, however, spring 106 is effective to pull ledge 108 down through the slack to positively drop into notch 117**.)

After one shift cycle in response to the depression of a shift key as just described, two events may occur.

One event is when the shift keys 35 and 37 are released at the termination of the first shift cycle. Then spring 110 carries interposer 33 rearward immediately. If one of the keys 35 or 37 is held down, however, temporary latching as described is achieved between notch 117 and ledge 108. This temporary latching occurs when a shift to upper case is conducted and a shift key is kept depressed. Any number of upper case characters may be typed before the keys 35 and 37 are released.

Thus, regardless of when the keys 35 and 37 are released, at the time of release spring 110 pulls interposer 33 rearward because the temporary latching between notch 117 and ledge 108 ceases when the shift keylever 92 goes upward under the influence of spring 96. A complete cycle of shift as above described then occurs because the interposer 33 is held down below stop 112 by spring 115 and therefore freely moves rearward under the influence of spring 110. Spring 140 comes into action as a clutch and member 142 again is moved in the same direction as before to present this time the lower dwell of cam 136 to roller 138.

One basic difference on a down shift operation is in the conformation of camming surface **148*a*. Surface 148*a* is slanted downward somewhat more greatly. This downward movement brings arm 130 in front of lug 146*a* to thereby decouple the spring clutch. The downward movement is transferred through arm 128, through rod 118, to interposer 33. The movement is large enough to bring shift interposer 33 forward in front of spring 115. Arm 130 leaves camming surface 148*a* somewhat before it intersects lug 146*a*. Interposer 33 then goes up and rearward under the bias of spring 110 and thereby is returned rearward to the latched position against stop 112. Then shift interposer 33 is fully latched. A new depression of keys 35 or 37** is required to initiate another shift cycle.

CONCLUSION

The interlocking by print cycle cam 134 which occurs substantially into the cycle at those times when print occurs before the start of a shift operation has some similarities to that shown in the previously mentioned U.S. 3,077,971. The interlocking done when shift occurs before print is believed to be highly novel, as is the use of interlocking dependent upon interposer presence during those portions of a print operation in which a print interposer is still in the interlock.

The following claims for patent protection therefore should be considered as being directed primarily to features having to do with those operations, but it should be understood that not every alternative based upon the invention claimed need utilize the interposer presence interlock described in the preferred embodiment. One alternative known, for example, uses the camming action at the moving member 142 as described, but the interlock would be by a part carried on rod 118. When rod 118 is rotated as described at the start of a shift operation, the part would be rotated to positively block the movement by which latch 57 could free clutch 59 to conduct a print cycle. Similarly, when latch 57 is moved to start a print cycle, the part would be blocked from movement, thereby blocking rotation of rod 118 and thus preventing a shift operation. This alternative embodiment is essentially practical and theoretically provides virtually complete interlocking since the structures which control interlocking are closely linked to those which initiate the print and shift operations involved. On the other hand, implementation of this alternative would be expected to establish difficult tolerance problems.

The use of a shift interposer is thought to be entirely novel in the context used throughout this specification and also quite beneficial. The structures provided are efficient and provide complete interlocking between shifting and printing.

While the invention has been particularly shown and described with reference to a preferred embodiment thereof, it will be understood by those skilled in the art that the foregoing and other changes in form and details may be made therein without departing from the spirit and scope of the invention.

I claim:

1. A typewriter adapted to print using a print head with different sectors, one sector having characters formed thereon related to one shift position and another sector having characters formed thereon related to a second shift position, said typewriter having:

a plurality of first key controlled means for controlling the printing from a sector of said print head of at least some of the characters to be printed, a plurality of print interposers, each individually associated with a different one of said first key controlled means, interlock means operated in response to the physical position of any one of said print interposers to prevent operation of another interposer, a print function element adapted to move as a part of a printing operation said print interposers out of position to operate said interlock means, at least one second key controlled means for controlling movement of said head to present either of said sectors for the selection of characters, and a movable member linked to be operated by said second key controlled means, wherein the improvement comprises, at least one shift interposer associated with said second key controlled means, said shift interposer being positioned when operated by said second key controlled means to operate said interlock means, means linked to said shift interposer and positioned in relation to said movable member so that said movable member will force said shift interposer from a position operating said interlock means after said movable member has moved a pre-established amount, said shift interposer operating said interlock means when said shift interposer moves in one direction to an interlock operating position, and said shift interposer is linked to operate means to present either of said sectors for the selection of characters when said shift interposer moves in said one direction to a sector selecting position, and also including, means biasing said shift interposer in said one direction, first latching means positioned with respect to said shift interposer to normally hold said shift interposer from moving in said one direction past a pre-established position until said shift interposer is operated by said second key controlled means, and second latching means positioned with respect to said shift interposer to normally hold said shift interposer from moving in said one direction past said pre-established position while said second key controlled means is in one position related to selection of one of said sectors, but not while said second key controlled means is in another position related to selection of another of said sectors, and in which said movable member carries at least two camming surfaces, one of said camming surfaces being configured to force said shift interposer from said interlock operating position and into position to be held by said second latching means but not in position to be held by said first latching means, another of said camming surfaces being configured to force said shift interposer from said interlock operating position and also into position to be held by said first latching means.

2. A typewriter adapted to print using a print head with different sectors, one sector having characters formed thereon related to one shift position and another sector having characters formed thereon related to a second shift position, said typewriter having:

a plurality of first key controlled means for controlling the printing from a sector of said print head of at least some of the characters to be printed, a plurality of print interposers, each individually associated with a different one of said first key controlled means, interlock means operated in response to the physical position of any one of said print interposers to prevent operation of another interposer, a print function element adapted to move as a part of a printing operation said print interposers out of position to operate said interlock means, at least one second key controlled means for controlling movement of said head to present either of said sectors for the selection of characters, and wherein the improvement comprises, at least one shift interposer associated with said second key controlled means, said shift interposer being positioned when operated to operate said interlock means and initiate movement of said head to present a different sector on said print element for printing, and means linked to said shift interposer and moved as said different sector is positioned for printing to force said shift interposer from a position operating said interlock means, a drive means, normally inoperative shift movement means carrying at least two camming surfaces and operative to move said head to select said sectors of said head in response to said second key controlled means, and means to connect said drive means to said shift movement means, and in which, said means linked to said shift interposer operates said means to connect when said shift interposer is moved to said sector selecting position, and both said camming surfaces being configured to force said means linked to said shift interposer to a position operative to disengage said means to connect and force said shift interposer from a position operating said interlock means.

3. A typewriter adapted to print using a print head with different sectors, one sector having characters formed thereon related to one shift position and another sector having characters formed thereon related to a second shift position, said typewriter having:

a plurality of first key controlled means for controlling the printing from a sector of said print head of at least some of the characters to be printed, a plurality of print interposers, each individually associated with a different one of said first key controlled means, interlock means operated in response to the physical position of any one of said print interposers to prevent operation of another interposer, a print function element adapted to move as a part of a printing operation said print interposers out of position to operate said interlock means, at least one second key controlled means for controlling movement of said head to present either of said sectors for the selection of characters, and a movable member linked to be operated by said second key controlled means, wherein the improvement comprises, at least one shift interposer associated with said second key controlled means, said shift interposer being positioned when operated by said second key controlled means to operate said interlock means, means linked to said shift interposer and positioned in relation to said movable member so that said movable member will force said shift interposer from a position operating said interlock means after said movable member has moved a pre-established amount, a normally continuously driven member, normally inoperative shift movement means carrying at least two camming surfaces and operative to move said head to select said sectors of said head in response to said second key controlled means, and a clutch to connect said continuously driven member to said shift movement means, and in which, said means linked to said shift interposer operates to engage said clutch when said shift interposer is moved to said sector selecting position, both said camming surfaces are configured to force said means linked to said shift interposer to a position operative to disengage said clutch, and said means linked to said shift interposer comprises a rod connected to said shift interposer and journaled to the frame of said typewriter, said rod having a curve so as to be disposed in one plane at least at one point at which said rod is journaled to said frame and in another plane at a point at which said rod is connected to said shift interposer so that movement of said shift interposer causes rotation of said rod, said rod being connected to means operative with said camming surfaces so that said rod is rotated by said camming surfaces.

4. A typewriter adapted to print using a print head with different sectors, one sector having characters formed thereon related to one shift position and another sector having characters formed thereon related to a second shift position, said typewriter having:

a plurality of first key controlled means for controlling the printing from a sector of said print head of at least some of the characters to be printed, at least one second key controlled means for controlling movement of said head to present either of said sectors for the selection of characters, at least one source of power to effectuate printing and associated actions in response to operation of said first key controlled means and to effectuate movement of said head and associated actions in response to operation of said second key controlled means, a rotatable member connected to be rotated while said head is moving in response to operation of said second key controlled means, and interlock means operated in response to movement of a designated part to prevent printing while said head is moving in response to operation of said second key controlled means, wherein the improvement comprises, at least one shift interposer associated with said second key controlled means, means biasing said shift interposer in one direction, first latching means positioned in relation to said shift interposer to normally hold said shift interposer from moving in said one direction past a pre-established position until said shift interposer is operated by said second key controlled means, second latching means positioned in relation to said shift interposer to normally hold said shift interposer from moving in said one direction past said pre-established position while said second key controlled means is in one position related to selection of one of said sectors, but not while said second key controlled means is in another position related to selection of another of said sectors, means linked to said shift interposer to operate said interlock means when said shift interposer is moved in said one direction to one position past said pre-established position, at least two camming surfaces carried by said rotatable member, each of said camming surfaces having a different configuration, and means linked to said shift interposer and positioned in relation to said camming surfaces so that one of said camming surfaces will force said shift interposer out of said one position and into position to be held by said second latching means but not in position to be held by said first latching means and so that another of said camming surfaces will force said shift interposer out of said one position and also in position to be held by said first latching means.

5. The combination as in claim 4 specifically including:

at least one normally continuously driven member driven by said power source, normally inoperative shift movement means to move said head in response to operation of said second key controlled means, and a clutch to connect said continuously driven member to said shift movement means, and in which, said means linked to said shift interposer normally operates to engage said clutch when said shift interposer is moved to said one position, and both said camming surfaces are configured to force said means linked to said shift interposer to a position operative to disengage said clutch.

6. The combination as in claim 4 in which a rod is connected to said shift interposer, said rod being journaled to the frame of said typewriter and having a curve so as to be disposed in one plane at least at one point at which said rod is journaled to said frame and in another plane at a point at which said rod is connected to said shift interposer so that movement of said shift interposer causes rotation of said rod, said rod being linked to said shift interposer so that said rotation of said rod is dependent upon movement of said means linked to said shift interposer.

7. The combination as in claim 6 specifically including:

at least one normally continuously driven member driven by said power source, normally inoperative shift movement means to move said head in response to operation of said second key controlled means, and a clutch to connect said continuously driven member to said shift movement means, and in which, said means linked to said shift interposer normally operates to engage said clutch when said shift interposer is moved to said one position, and both said camming surfaces are configured to force said means linked to said shift interposer to a position operative to disengage said clutch.

8. The combination as in claim 4 in which said interlock means operates to prevent printing by preventing effective connection to said power source for transferring power to effectuate printing.

9. The combination as in claim 8 specifically including:

at least one normally continuously driven member driven by said power source, normally inoperative shift movement means to move said head in response to operation of said second key controlled means, and a clutch to connect said continuously driven member to said shift movement means, and in which, said means linked to said shift interposer normally operates to engage said clutch when said shift interposer is moved to said one position, and both said camming surfaces are configured to force said means linked to said shift interposer to a position operative to disengage said clutch.

10. A typewriter adapted to print using a print head with different sectors, one sector having characters formed thereon related to one shift position and another sector having characters formed thereon related to a second shift position, said typewriter having:

a plurality of first key controlled means for controlling the printing from a sector of said print head of at least some of the characters to be printed, a plurality of print interposers, each individually associated with a different one of said first key controlled means, first interlock means operated in response to the physical position of any one of said print interposers to prevent operation of another interposer, a print function element adapted to move as a part of a printing operation said print interposers out of position to operate said first interlock means, at least one second key controlled means for controlling movement of said head to present either of said sectors for the selection of characters, and second interlock means responsive to the physical positions of the typewriter mechanisms during part of a printing operation to prevent substantial movement of said head to present a sector of said head different from the sector presented, wherein the improvement comprises, at least one shift interposer associated with said second key controlled means, said shift interposer being positioned when operated by said second key controlled means to operate said first interlock means, and in which, said second interlock means is effective before said print cycle element moves a print interposer out of position to operate said first interlock means so that normally initiation of a print operation is immediately interlocked against a shift operation by said first interlock means and subsequently in a print operation, while said first interlock means is first effective, said second interlock means also becomes effective.

11. The combination as in claim 10 also including:

a movable member linked to be operated by said second key controlled means, and means linked to said shift interposer and positioned in relation to said movable member so that said movable member will force said shift interposer from a position operating said first interlock means after said movable member has moved a pre-established amount.

12. The combination as in claim 11 in which:

said shift interposer operates said first interlock means when said shift interposer moves in one direction to an interlock operating position, and said shift interposer is linked to operate means to present either of said sectors for the selection of characters when said shift interposer moves in said one direction to a sector selecting position, and also including, means biasing said shift interposer in said one direction, first latching means positioned with respect to said shift interposer to normally hold said shift interposer from moving in said one direction past a pre-established position until said shift interposer is operated by said second key controlled means, and second latching means positioned with respect to said shift interposer to normally hold said shift interposer from moving in said one direction past said pre-established position while said second key controlled means is in one position related to selection of one of said sectors, but not while said second key controlled means is in another position related to selection of another of said sectors, and in which, said movable member carries at least two camming surfaces, one of said camming surfaces being configured to force said shift interposer from said interlock operating position and into position to be held by said second latching means but not in position to be held by said first latching means, another of said camming surfaces being configured to force said shift interposer from said interlock operating position and also into position to be held by said first latching means.

13. The combination as in claim 12 also including:

a normally continuously driven member, normally inoperative shift movement means to move said head to select said sectors of said head in response to said second key controlled means, and a clutch to connect said continuously driven member to said shift movement means, and in which, said means linked to said shift interposer operates to engage said clutch when said shift interposer is moved to said sector selecting position, and both said camming surfaces are configured to force said means linked to said shift interposer to a position operative to disengage said clutch.

14. The combination as in claim 13 in which said means linked to said shift interposer comprises:

a rod connected to said shift interposer and journaled to the frame of said typewriter, said rod having a curve so as to be disposed in one plane at least at one point at which said rod is journaled to said frame and in another plane at a point at which said rod is connected to said shift interposer so that movement of said shift interposer causes rotation of said rod, said rod being connected to means operative with said camming surfaces so that said rod is rotated by said camming surfaces.

References Cited

UNITED STATES PATENTS

| | | | |
|---|---|---|---|
| 3,077,971 | 2/1963 | Palmer | 197—16 |
| 3,086,635 | 4/1963 | Palmer | 197—16 |
| 3,157,265 | 11/1964 | Palmer | 197—16 |
| 3,195,707 | 7/1965 | Reynard | 197—16 |

ROBERT E. PULFREY, *Primary Examiner.*

E. S. BURR, *Examiner.*